US011580386B2

(12) United States Patent
Hong

(10) Patent No.: US 11,580,386 B2
(45) Date of Patent: Feb. 14, 2023

(54) CONVOLUTIONAL LAYER ACCELERATION UNIT, EMBEDDED SYSTEM HAVING THE SAME, AND METHOD FOR OPERATING THE EMBEDDED SYSTEM

(71) Applicant: Electronics and Telecommunications Research Institute, Daejeon (KR)

(72) Inventor: Seung-Tae Hong, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 509 days.

(21) Appl. No.: 16/729,135

(22) Filed: Dec. 27, 2019

(65) Prior Publication Data
US 2020/0302291 A1    Sep. 24, 2020

(30) Foreign Application Priority Data

Mar. 18, 2019 (KR) .................... 10-2019-0030478
Nov. 22, 2019 (KR) .................... 10-2019-0151461

(51) Int. Cl.
*G06N 3/08* (2006.01)
*G06F 9/38* (2018.01)
(Continued)

(52) U.S. Cl.
CPC ............. *G06N 3/08* (2013.01); *G06F 9/3836* (2013.01); *G06F 9/3877* (2013.01);
(Continued)

(58) Field of Classification Search
CPC ........ G06F 9/545; G06F 9/3836; G06F 17/16; G06F 9/3877; G06F 9/5005; G06F 9/546; G06N 3/0454; G06N 3/08; G06N 3/063
(Continued)

(56) References Cited

U.S. PATENT DOCUMENTS 10,048,988 B2    8/2018  Hong et al.
11,036,827 B1*   6/2021  Zejda ................. G06N 3/063
(Continued)

FOREIGN PATENT DOCUMENTS

CN     109086867 A    12/2018
JP     2018067154 A    4/2018
(Continued)

OTHER PUBLICATIONS

David Cronin, "Deep Neural Network Algorithms on Graphics Processors for Embedded Systems," School of Computer Science and Statistics, May 10, 2018, pp. 1-76, Submitted to the University of Dublin, Trinity College.

*Primary Examiner* — Chun Kuan Lee
(74) *Attorney, Agent, or Firm* — William Park & Associates Ltd.

(57) ABSTRACT

Disclosed herein are a convolutional layer acceleration unit, an embedded system having the convolutional layer acceleration unit, and a method for operating the embedded system. The method for operating an embedded system, the embedded system performing an accelerated processing capability programmed using a Lightweight Intelligent Software Framework (LISF), includes initializing and configuring, by a parallelization managing function entity (FE), entities present in resources for performing mathematical operations in parallel, and processing in parallel, by an acceleration managing FE, the mathematical operations using the configured entities.

19 Claims, 7 Drawing Sheets

(51) Int. Cl.
  *G06F 9/50* (2006.01)
  *G06F 17/16* (2006.01)
  *G06F 9/54* (2006.01)

(52) U.S. Cl.
  CPC ............ *G06F 9/5005* (2013.01); *G06F 9/545* (2013.01); *G06F 9/546* (2013.01); *G06F 17/16* (2013.01)

(58) Field of Classification Search
  USPC .......................................................... 706/25
  See application file for complete search history.

(56) References Cited

U.S. PATENT DOCUMENTS

| | | |
|---|---|---|
| 11,132,302 B2 | 9/2021 | Kim et al. |
| 2017/0277658 A1 | 9/2017 | Pratas et al. |
| 2018/0129935 A1 | 5/2018 | Kim et al. |
| 2018/0131946 A1 | 5/2018 | Lee et al. |
| 2018/0157969 A1* | 6/2018 | Xie ........................... G06F 7/57 |
| 2018/0189981 A1* | 7/2018 | Singh ...................... G06F 13/10 |
| 2018/0322387 A1* | 11/2018 | Sridharan ................ G06N 3/08 |
| 2019/0205780 A1 | 7/2019 | Sakaguchi |

FOREIGN PATENT DOCUMENTS

| | | |
|---|---|---|
| KR | 1020160059252 A | 5/2016 |
| KR | 1020170096105 A | 8/2017 |
| KR | 101847874 B1 | 5/2018 |
| KR | 1020180086792 A | 8/2018 |
| KR | 1020180123846 A | 11/2018 |
| WO | 2015199325 A1 | 12/2015 |

\* cited by examiner

CONVOLUTIONAL LAYER ACCELERATION UNIT, EMBEDDED SYSTEM HAVING THE SAME, AND METHOD FOR OPERATING THE EMBEDDED SYSTEM

CROSS REFERENCE TO RELATED APPLICATION

This application claims the benefit of Korean Patent Application No. 10-2019-0030478, filed Mar. 18, 2019, and No. 10-2019-0151461, filed Nov. 22, 2019, which are hereby incorporated by reference in their entireties into this application.

BACKGROUND OF THE INVENTION

1. Technical Field

The present invention relates to a convolutional layer acceleration unit, an embedded system having the convolutional layer acceleration unit, and a method for operating the embedded system.

2. Description of the Related Art

Generally, a Convolutional Neural Network (CNN), which is one type of Deep Neural Network (DNN), has been used in various visual image analysis fields, such as the classification of objects contained in an image. A convolutional neural network is generally composed of a single input layer, a single output layer, and multiple hidden layers. The hidden layers are chiefly composed of a convolutional layer, a pooling layer, and fully connected layers. The input layer receives data from an image or a dataset, and an array-type floating point data type is chiefly used for the input layer. The convolutional layer is used to extract features from input data and has a weight and a bias for the input data. The pooling layer extracts the maximum value or an average value within an area having a preset size, from values input from a previous layer, and transfers the extracted value to a subsequent layer. The fully connected layer is used to classify the results of operations and has a weight and a bias identical to those of the convolutional layer. The output layer is chiefly configured subsequent to the fully connected layer and has an inference probability for input data as a value.

SUMMARY OF THE INVENTION

Accordingly, the present invention has been made keeping in mind the above problems occurring in the prior art, and an object of the present invention is to provide a convolutional layer acceleration unit that employs an accelerator (acceleration unit) for a convolutional layer which spends most operation time in forward propagation of a convolutional neural network even if there is no professional knowledge about an embedded system and Open Computing Language (OpenCL) because the embedded to system automatically analyzes the features of a convolutional layer and provides layer parallel processing for multiple convolutional layers using OpenCL devices based on the analyzed convolutional layer information, an embedded system having the convolutional layer acceleration unit, and a method for operating the embedded system.

In accordance with an aspect of the present invention to accomplish the above object, there is provided a method for operating an embedded system, the embedded system performing an accelerated processing capability programmed using a Lightweight Intelligent Software Framework (LISF), including initializing and configuring, by a parallelization managing Function Entity (FE), entities present in resources for performing mathematical operations in parallel; and processing in parallel, by an acceleration managing FE, the mathematical operations using the configured entities.

The entities may include a platform, a device, a context, a command queue, and a kernel.

The platform may include heterogeneous platforms, each being configured using at least one Central Processing Unit (CPU), at least one Graphics Processing Unit (GPU), at least one processor, or at least one hardware acceleration unit.

The device may include actual processors for performing the mathematical operations.

The context may include an entity for managing the resources in a device set.

The command queue may include an entity for executing a kernel and performing memory mapping/unmapping and synchronization.

The kernel may include a code running on the device.

The mathematical operations may be operations in a convolutional layer.

The parallelization managing FE may allocate a device memory, copy data from a host to a device, set a kernel, and again copy results of an operation.

Instances of the kernel may be executed in parallel while each of the instances is processing a single work item.

Instances of the kernel may be executed together as multiple work items as a part of a work group.

An instance of each kernel in the work group may communicate with an additional instance.

The parallelization managing FE manages a parallel-processing queue for performing parallel processing depending on a number of OpenCL devices of the embedded system.

The parallelization managing FE may manage a parallel-processing queue for performing parallel processing depending on a number of OpenCL devices of the embedded system.

The parallelization managing FE divides a matrix with weights and bias values considering a parallel processing performance of the device to maximize parallelism in multiple device environments, the parallel processing capability of the device is determined by the number of kernel instances that are executed at a time, a maximum work group size of the device or a maximum work item size.

The acceleration managing FE controls the resources so that a corresponding OpenCL device performs a General Matrix Multiply (GEMM) operation on the divided matrix and input data depending on the divided matrix.

The GEMM operation may be represented by an equation of $C=\alpha AB+\beta C$, where A, B, and C are matrices and $\alpha$ and $\beta$ are scalar values, sizes of matrices A, B, and C are indicated by M, N, and K, the size of matrix A is M*K, the size of matrix B is K*N, and the size of matrix C is M*N.

The parallelization managing FE may divide rows of matrix A by a number of OpenCL devices, and a size of a sub-matrix resulting from division may be determined by a number of corresponding OpenCL devices and a number of usable OpenCL devices.

The acceleration managing FE may group matrix B into vectors to maximize a workload for each kernel of each OpenCL device.

The acceleration managing FE may determine on a size of a local work group and a size of a global work group to allow each OpenCL device to perform parallel processing.

In accordance with another aspect of the present invention to accomplish the above object, there is provided a convolutional layer acceleration unit of an embedded system, including at least one processor; and a memory for storing at least one instruction to be executed by the at least one processor, wherein the at least one instruction is configured to operate the at least one processor such that a convolutional layer application unit receives convolutional layer information of a convolutional neural network; a convolutional layer analysis unit analyzes the convolutional layer information and determines whether to perform layer parallel processing based on whether a convolutional layer corresponding to OpenCL device information is independent; the convolutional layer parallel processing execution unit is configured to, when the convolutional layer is independent, divide a matrix corresponding to the convolutional layer in consideration of performance of individual OpenCL devices, and process operations corresponding to the convolutional layer in parallel using the divided matrix; and the convolutional layer parallel processing execution unit is configured to, when the convolutional layer is not independent, process the corresponding operations in parallel based on a kernel through a single OpenCL device.

In accordance with a further aspect of the present invention to accomplish the above object, there is provided an embedded system, including resources; and a convolutional layer acceleration unit, wherein the convolutional layer acceleration unit is configured such that a parallelization managing FE initializes and configures entities present in the resources for performing mathematical operations in parallel; and an acceleration managing FE processes the mathematical operations in parallel using the configured entities.

BRIEF DESCRIPTION OF THE DRAWINGS

The above and other objects, features and advantages of the present invention will be more clearly understood from the following detailed description taken in conjunction with the accompanying drawings. However, the technical features of the present embodiment are not limited to a specific drawing, and the features disclosed in respective drawings may be combined and implemented as new embodiments.

DESCRIPTION OF THE PREFERRED EMBODIMENTS

Figure 1:
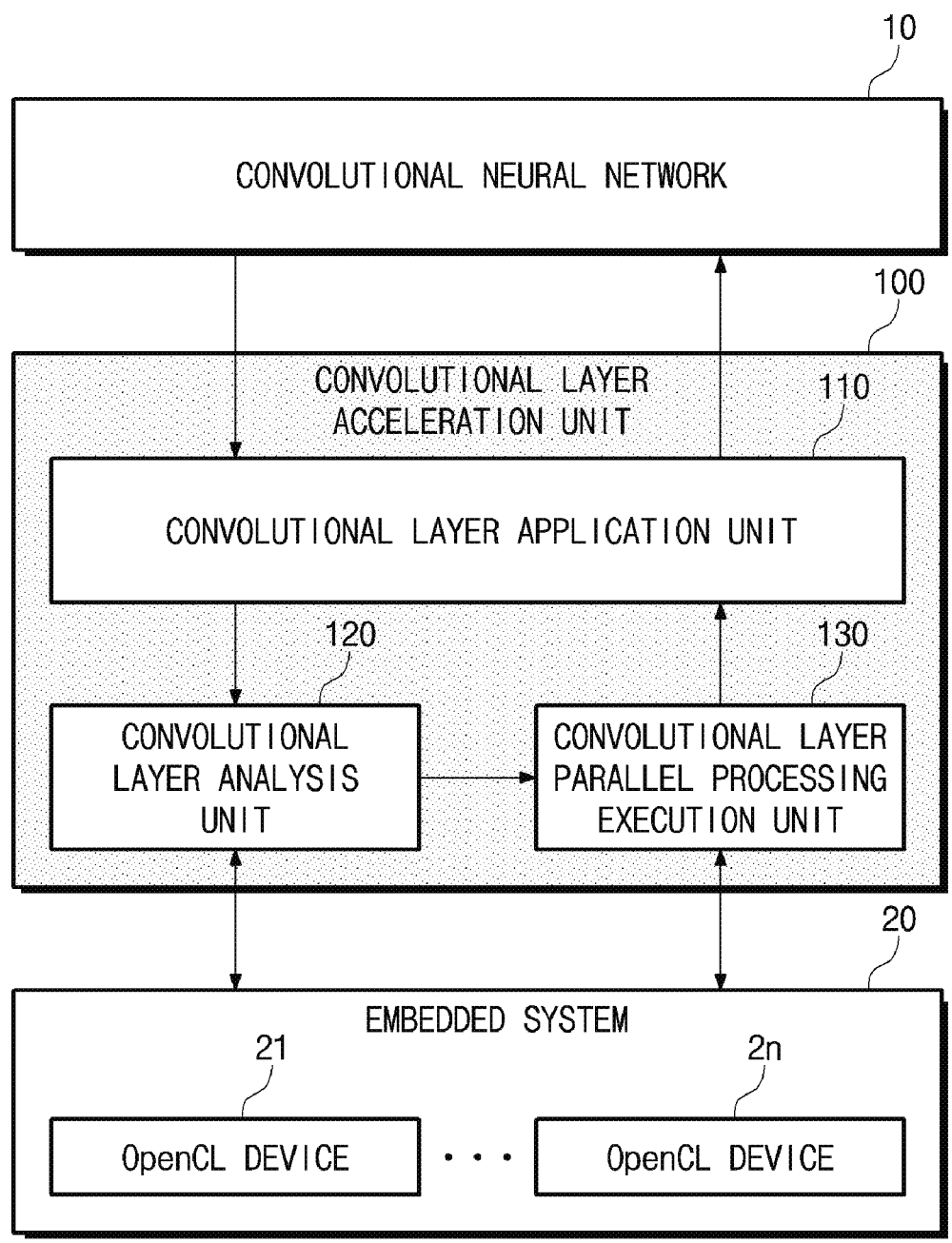
FIG. 1 is a diagram exemplarily illustrating a convolutional layer acceleration unit according to an embodiment of the present invention.

Embodiments of the present invention are described with reference to the accompanying drawings in order to describe the present invention in detail so that those having ordinary knowledge in the technical field to which the present invention pertains can easily practice the present invention. Reference will now be made in detail to various embodiments of the present invention, specific examples of which are illustrated in the accompanying drawings and described below, since the embodiments of the present invention can be variously modified in many different forms. However, this is not intended to limit the present invention to particular modes of practice, and it is to be appreciated that all changes, equivalents, and substitutes that do not depart from the spirit and technical scope of the present invention are encompassed in the present invention. It will be understood that, although the terms "first" and "second" may be used herein to describe various elements, these elements should not be limited by these terms.

These terms are only used to distinguish one element from another element. For instance, a first element discussed below could be termed a second element without departing from the teachings of the present invention. Similarly, the second element could also be termed the first element. It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present.

The terminology used herein is for the purpose of describing particular embodiments only and is not intended to be limiting. In the present invention, the singular forms are intended to include the plural forms as well, unless the context clearly indicates otherwise.

It should be further understood that the terms "comprise", "include", and "have" when used in this specification, specify the presence of stated features, integers, steps, operations, elements, components, and/or combinations of them but do not preclude the presence or addition of one or more other features, integers, steps, operations, elements, components, and/or combinations thereof. Unless otherwise defined, all terms including technical and scientific terms used herein have the same meaning as commonly understood by one of ordinary skill in the art to which the present invention belongs. It will be further understood that terms used herein should be interpreted as having a meaning that is consistent with their meaning in the context of this specification and the relevant art and will not be interpreted in an idealized or overly formal sense unless expressly so defined herein.

Generally, a convolutional neural network includes forward propagation, which performs inference on input data while performing an operation in the direction from an input layer to an output layer, and backward propagation, which performs learning while performing an operation in the direction from the output layer to the input layer. During inference, only forward propagation is performed, and during learning, a gradient is calculated based on an error (difference) between the result of inference, acquired from forward propagation, and an actual value. The calculated gradient is used to correct the values of hidden layers so that the error between the result of inference and the actual value is minimized. Generally, since learning requires a lot of system resources such as memory, it is performed in a server-class high-specification system environment. In an embedded system having limited system resources, forward propagation for inferring a single image or a small number of images is mainly used. Meanwhile, due to the features of forward propagation of a convolutional neural network, which calculates an inference probability for features extracted from an image through multiple hidden layers, the convolutional layer spends most operation time in forward propagation of the convolutional neural network.

A convolutional layer acceleration unit, an embedded system having the convolutional layer acceleration unit, and a method for operating the embedded system according to embodiments of the present invention may perform parallel processing for the convolutional layer having the highest computational complexity in a convolutional neural network in order to accelerate forward propagation in the convolutional neural network. Further, the convolutional layer acceleration unit, the embedded system having the convolutional layer acceleration unit, and the method for operating the embedded system according to embodiments of the present invention may provide layer parallel processing for multiple convolutional layers which are independently configured in the convolutional neural network.

Also, since the embedded system is composed of various types of hardware platforms, a parallel-computing framework that can perform parallel processing in various heterogeneous hardware environments is essentially required. The convolutional layer acceleration unit, the embedded system having the convolutional layer acceleration unit, and the method for operating the embedded system according to embodiments of the present invention may perform parallel processing using multiple Open Computing Language (OpenCL) devices. Here, OpenCL, which is an open general-purpose computing framework, can provide parallel computing for heterogeneous platforms composed of combinations of additional processors, as well as a Central Processing Unit (CPU) and a Graphics Processing Unit (GPU). Meanwhile, it should be understood that the present invention is not limited to OpenCL. The present invention may be applied to a framework for a kernel.

The convolutional layer acceleration unit, the embedded system having the convolutional layer acceleration unit, and the method for operating the embedded system according to embodiments of the present invention may divide individual convolutional layers based on the performance of individual OpenCL devices based on the features of OpenCL, and may process the divided convolutional layers in parallel through multiple OpenCL devices. The convolutional layer acceleration unit, the embedded system having the convolutional layer acceleration unit, and the method for operating the embedded system according to embodiments of the present invention may be configured such that the embedded system automatically analyzes the features of convolutional layers and provides layer parallel processing for multiple convolutional layers using multiple OpenCL devices based on the analyzed convolutional layer information, and thus an accelerator (acceleration unit) for a convolutional layer that spends most operation time in forward propagation of the convolutional neural network may be used, even if professional knowledge about the embedded system and OpenCL is not present.

In an embodiment, when corresponding convolutional neural networks are independent layers which do not influence other convolutional neural networks, layer parallel processing for multiple convolutional layers may be performed such that the corresponding convolutional layers are processed in parallel using multiple OpenCL devices.

Further, the embedded system according to an embodiment of the present invention may provide parallel processing for forward propagation of a convolutional neural network for inferring a single image or a small number of images in a single OpenCL platform environment in which a unified memory architecture is provided and which has multiple OpenCL devices.

FIG. 1 is a diagram exemplarily illustrating a convolutional layer acceleration unit 100 according to an embodiment of the present invention. Referring to FIG. 1, the convolutional layer acceleration unit 100 may include a convolutional layer application unit 110, a convolutional layer analysis unit 120, and a convolutional layer parallel processing execution unit 130.

The convolutional layer application unit 110 may provide a user interface for allowing the convolutional layer acceleration unit 100 to be used in a convolutional neural network 10, and may transfer convolutional layer information to the convolutional layer analysis unit 120.

Further, the convolutional layer application unit 110 may provide a user interface for utilizing the function of the convolutional layer acceleration unit 100. Here, it is assumed that all memory spaces for respective convolutional layers have been allocated before the user interface of the convolutional layer application unit is called.

In an embodiment, information received by the user interface of the convolutional layer application unit 110 may include the number of filters for extracting features, the size of each filter, the size of padding of each filter, the size of the stride of each filter, whether a bias is to be used, the memory address of input data, and the memory address of output data. Here, each filter is assumed to have a shape, the horizontal and vertical sizes of which are equal to each other, and the sizes of the padding and stride of the filter may be equally applied to the horizontal and vertical sizes of the filter.

In an embodiment, the convolutional layer information, input through the user interface of the convolutional layer application unit 110, may be transferred to the convolutional layer analysis unit 120.

The convolutional layer analysis unit 120 may analyze the convolutional layer information, transferred through the convolutional layer application unit 110, and may check whether each convolutional layer is independent.

Also, the convolutional layer analysis unit 120 may determine whether to perform layer parallel processing by checking whether each convolutional layer is independent based on the information transferred through the convolutional layer application unit 110 and information about OpenCL devices.

In an embodiment, the convolutional layer analysis unit 120 may manage a layer parallel processing queue for performing parallel processing. Here, the maximum size of the queue may be the maximum number of convolutional layers that can be processed in parallel at one time. For example, the maximum size of the queue may be set to the number of OpenCL devices provided by an embedded system 20. If the number of OpenCL devices that can be used in the embedded system 20 is 1, the layer parallel processing queue is not generated.

In an embodiment, when the memory address of input data or output data is not present in an additional convolutional layer (or when the corresponding convolutional layer does not influence the additional convolutional layer), and when a memory space indicated by the address of input data is not empty and a certain value (not NULL) is present in the memory space, the convolutional layer analysis unit 120 may insert the corresponding convolutional layers into the layer parallel processing queue.

In an embodiment, the convolutional layer analysis unit 120 may transfer the convolutional layers stored in the layer parallel processing queue to the convolutional layer parallel processing execution unit 130. When parallel processing of the transferred convolutional layers is completed through the convolutional layer parallel processing execution unit 130, the completed convolutional layers may be deleted from the layer parallel processing queue.

In an embodiment, the convolutional layer analysis unit 120 allows single OpenCL device-based parallel processing to be performed for non-independent convolutional layers through the convolutional layer parallel processing execution unit 130.

In an embodiment, the convolutional layer analysis unit 120 may repeatedly perform the above-described process until parallel processing of all of the convolutional layers has been performed.

The convolutional layer parallel processing execution unit 130 may perform parallel processing using multiple OpenCL devices 21, . . . , 2n (where n is an integer of 2 or more), and may transfer the results of performance thereof to a user through the convolutional layer application unit 110.

When the embedded system 20 having multiple OpenCL devices performs forward propagation of the convolutional neural network 10, the convolutional layer acceleration unit 100 according to the embodiment of the present invention may automatically analyze the convolutional layer information of the convolutional neural network, and may utilize an acceleration function for forward propagation of the convolutional layers based on multiple OpenCL devices through such analysis even if professional knowledge about OpenCL or the embedded system 20 is not present.

Figure 2:
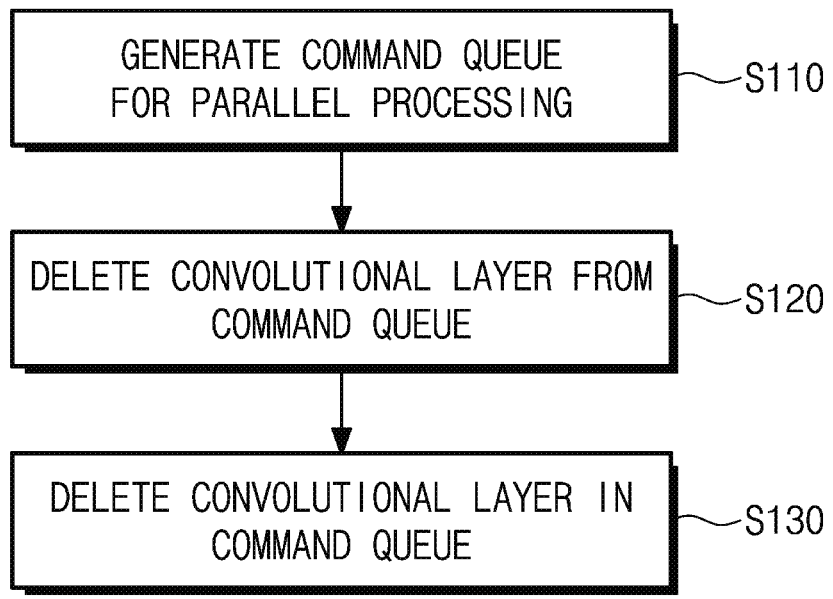
FIG. 2 is a flowchart exemplarily illustrating a method for operating a convolutional layer analysis unit according to an embodiment of the present invention.

FIG. 2 is a flowchart exemplarily illustrating a method for operating the convolutional layer analysis unit 120 according to an embodiment of the present invention. Referring to FIGS. 1 and 2, the operation of the convolutional layer analysis unit 120 may be performed as follows.

The convolutional layer analysis unit 120 may generate a command queue for performing parallel processing for convolutional layers based on convolutional layer information and OpenCL device information at step S110. The convolutional layer analysis unit 120 may insert convolutional layers, in which input data is not NULL data and which do not influence additional convolutional layers, into the command queue generated for parallel processing at step S120. The convolutional layer analysis unit 120 may delete convolutional layers, for which parallel processing has been completed by the convolutional layer parallel processing execution unit 130, from the command queue generated for parallel processing at step S130. In an embodiment, the convolutional layer analysis unit 120 may repeatedly perform steps S120 and S130 until parallel processing of all convolutional layers has been completed.

Figure 3:
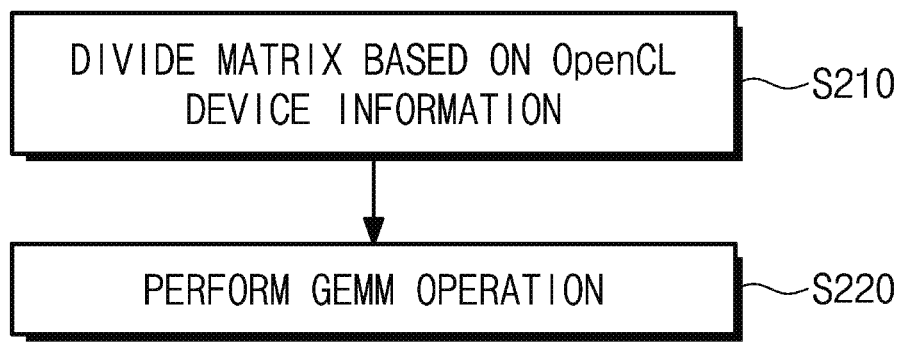
FIG. 3 is a flowchart exemplarily illustrating a method for operating a convolutional layer parallel processing unit according to an embodiment of the present invention.

FIG. 3 is a flowchart exemplarily illustrating a method for operating the convolutional layer parallel processing execution unit 130 according to an embodiment of the present invention. Referring to FIGS. 1 to 3, the operation of the convolutional layer parallel processing execution unit 130 may be performed as follows.

The convolutional layer parallel processing execution unit 130 may divide a matrix based on OpenCL device information. For example, the convolutional layer parallel processing execution unit 130 may divide a matrix having a weight and a bias value in consideration of the performance of each OpenCL device at step S210. In an embodiment, after the matrix has been divided, separate grouping may be performed within each additionally divided matrix.

Thereafter, each OpenCL device performs a General Matrix Multiplication (or Multiply) (hereinafter referred to as "GEMM") operation on each divided matrix and input data, thus enabling layer parallel processing to be performed for each convolutional layer at step S220.

The convolutional layer parallel processing execution unit 130 may perform layer parallel processing for individual convolutional layers transferred through the parallel-processing queue.

Meanwhile, the GEMM operation for each convolutional layer may include an operation such as C=αAB+βc (where A, B, and C denote matrices and a and denote scalar values). Here, the sizes of the matrices A, B, and C are indicated by M, N, and K, wherein matrix A may have a size of M*K, matrix B may have a size of K*N, and matrix C may have a size of M*N. Here, the weight or bias of the convolutional layer may correspond to matrix A (or a first matrix), input data may correspond to matrix B (or a second matrix), and output data may correspond to matrix C (or a third matrix).

In an embodiment, the convolutional layer parallel processing execution unit 130 may divide the number of rows (row size) in matrix A by the number of multiple OpenCL devices.

In an embodiment, the row size of the divided matrix may be decided on using the following Equations (1) and (2):

The following Equation (1) shows a basic unit decision formula for matrix division.

$$P_n = \text{floor}\left(M * \frac{CU_n}{\sum_{i=1}^{D} CU_i}\right) \text{ when } n \neq D \quad (1)$$

The following Equation (2) shows a decision formula for the row size of each sub-matrix resulting from division.

$$SubM_n = \text{Max}(P_n - (P_n \% WS), MinSubM) \text{ when } n \neq D \quad (2)$$

$$SubM_n = M - \sum_{i=1}^{D-1} SubM_i \text{ when } n = D$$

In the following description, for convenience of description, it is assumed that Equation (1) and Equation (2) are given in the case where the maximum number of usable OpenCL devices is 2 or more.

In Equations (1) and (2), n is the number of the corresponding OpenCL device to which a matrix division criterion is to be applied. D denotes the maximum number of usable OpenCL devices. The numbers of respective OpenCL devices may be sequentially assigned in descending order from the OpenCL device having a larger value of CL_DEVICE_MAX_COMPUTE_UNITS, among pieces of OpenCL device information. Also, in Equation (1), CU denotes the number of compute units of the corresponding OpenCL device. CU may be set to the value of CL_DEVICE_MAX_COMPUTE_UNITS, among the pieces of OpenCL device information. Also, in Equation (1), M denotes the row size of matrix A. A floor ( ) function denotes a function of returning either an integer that is less than a calculated value or the greatest integer.

In Equation (2), $SubM_n$ denotes the row size of a sub-matrix resulting from division of an n-th OpenCL device. In Equation (2), WS may be set in consideration of the number of pieces of data that can be processed in parallel through a single instruction in the corresponding OpenCL device. In an embodiment, among pieces of OpenCL device information, WS may be set to the value of CL_KERNEL_PREFERRED_WORK_GROUP_SIZE_MULTIPLE or to a multiple of 16. In Equation (2), MinSubM denotes the minimum value of the row sizes of sub-matrices resulting from division. MinSubM may be determined in consideration of the value of CL_DEVICE_MAX_WORK_GROUP_SIZE or the value of CL_DEVICE_MAX_WORK_ITEM_SIZES of the corresponding OpenCL device and the row size M of matrix A.

Matrix A may be divided into a number of rows corresponding to the size of $SubM_n$ of Equation (2) (where n is the number of the corresponding OpenCL device) from the first OpenCL device. The size of each sub-matrix $A_n$ resulting from division may be represented by ($SubM_n$*K).

The convolutional layer parallel processing execution unit 130 according to an embodiment of the present invention may create a memory object for the divided matrix using a sub-buffer function of OpenCL in order to minimize overhead occurring when the matrix is divided and the results of GEMM operations are combined with each other. That is, the convolutional layer parallel processing execution unit 130 may create a memory object for matrix A using clCreateBuffer, which is a memory object generation Application Programming Interface (API) of OpenCL, and may thereafter create a memory object for a sub-matrix $A_n$ resulting from division of each OpenCL device using clCreateSubBuffer, which is a sub-buffer creation API, based on the memory object for matrix A.

In an embodiment, matrix B may be used in common when each OpenCL device performs a GEMM operation. Individual OpenCL devices may share and use a single memory object for matrix B.

In an embodiment, matrix C may be generated by combining individual matrices $C_n$ (where n is the number of the corresponding OpenCL device) which store the results of GEMM operations in respective OpenCL devices. Here, the size of each matrix $C_n$ is ($SubM_n$*N).

Further, the convolutional layer parallel processing execution unit 130 allows individual OpenCL devices to share matrix data without requiring copying of data, by utilizing the clEnqueueMapBuffer, which is the memory object mapping API of OpenCL, and clEnqueueUnmapMemObject, which is an unmapping API, in order to minimize data copying costs during parallel processing.

Furthermore, the convolutional layer parallel processing execution unit 130 may group matrix B into vectors in order to maximize the workload for each kernel of each OpenCL device, and may perform GEMM operations with respective elements of $A_n$ assigned to each OpenCL device. In an embodiment, the number of vector groups may be determined in consideration of CL_KERNEL_PREFERRED_WORK_GROUP_SIZE_MULTIPLE, among pieces of OpenCL device information. For example, CL_KERNEL_PREFERRED_WORK_GROUP_SIZE_MULTIPLE may generally have a value that is a multiple of 4. In the following description, for convenience of description, the number of vector groups is set to 4.

In an embodiment, the convolutional layer parallel processing execution unit 130 may decide on the size of a local work group and the size of a global work group in order for each OpenCL device to execute parallel processing.

The convolutional layer parallel processing execution unit 130 according to the embodiment of the present invention may perform parallel processing on kernels by configuring a two-dimensional (2D) spatial index. Accordingly, each of the local work group and the global work group may have rows and columns in a 2D space. Since the convolutional layer parallel processing execution unit 130 performs parallel processing by grouping four elements of matrix B into vectors, the size of the local work group may be set to (4, 4). The size of the global work group may be decided on using the following Equation (3). Equation (3) shows the decision of the size of the global work group when layer parallel processing is performed.

$$GZ_n(i, j) = \left( RoundUp(SubM_n, 4), RoundUp\left(\frac{N-1}{4} + 1, 4\right)\right) \quad (3)$$

In Equation (3), i and j denote the row and column of a 2D space, $GZ_n$ denotes the size of the global work group of an n-th OpenCL device, and RoundUP (A, B) denotes a function of rounding off a value so that a remainder becomes 0 if the remainder is not 0 when A is divided by B.

Also, the convolutional layer parallel processing execution unit 130 may perform single OpenCL device-based parallel processing for a non-independent convolutional layer that is not transferred through a parallel-processing queue. When single OpenCL device-based parallel processing is performed, the convolutional layer parallel processing execution unit 130 may group matrix B in the same way as the performance of layer parallel processing, and may then perform GEMM operations with respective elements of matrix A. When single OpenCL device-based parallel processing is performed, the number of vector groups and the size of the local work group are identical to those in the performance of layer parallel processing.

The size of the global work group when single OpenCL device-based parallel processing is performed is given in the following Equation (4). Equation (4) shows the decision of the size of a global work group when single OpenCL device-based parallel processing is performed.

$$GZ(i, j) = \left( RoundUp(M, 4), RoundUp\left(\frac{N-1}{4} + 1, 4\right)\right) \quad (4)$$

Figure 4:
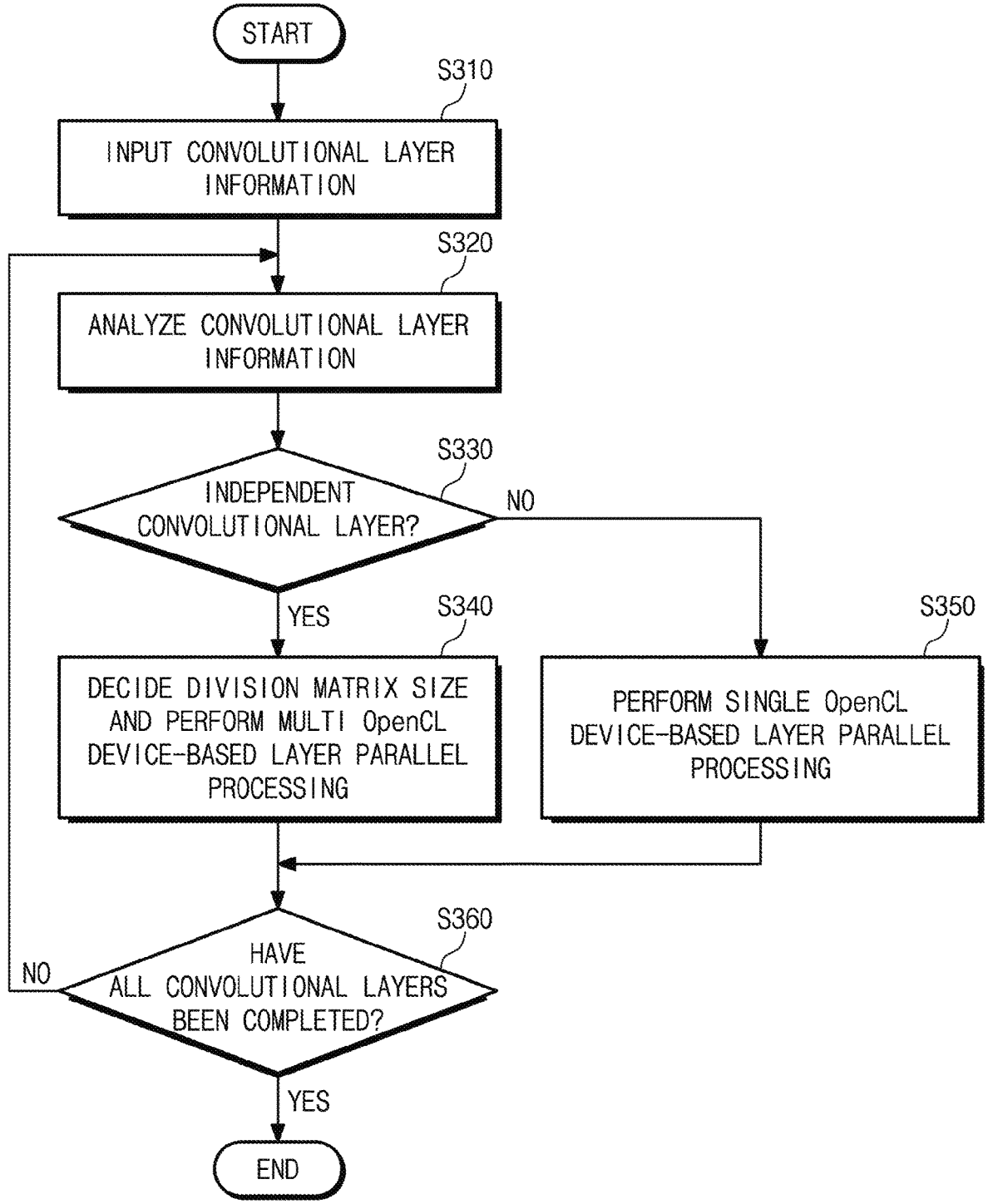
FIG. 4 is a flowchart exemplarily illustrating a method for operating the convolutional layer acceleration unit according to an embodiment of the present invention.

FIG. 4 is a flowchart exemplarily illustrating a method for operating the convolutional layer acceleration unit 100 according to an embodiment of the present invention. Referring to FIGS. 1 to 4, the convolutional layer acceleration unit 100 may be operated as follows. In the following description, for convenience of description, the number of OpenCL devices that are usable in the convolutional layer acceleration unit 100 is assumed to be 2 or more.

Through the convolutional layer application unit 110, convolutional layer information of a convolutional neural network 10 may be input from a user at step S310. The convolutional layer analysis unit 120 may analyze the convolutional layer information transferred from the convolutional layer application unit 110 at step S320. The convolutional layer analysis unit 120 may determine whether to perform layer parallel processing based on whether a convolutional layer corresponding to OpenCL device information is independent at step S330.

When the corresponding convolutional layer is independent, the convolutional layer parallel processing execution unit 130 may divide the corresponding convolutional layer in consideration of the performance of individual OpenCL devices, and may perform layer parallel processing in individual OpenCL devices (i.e. multi-OpenCL device-based layer parallel processing) at step S340.

In contrast, when the corresponding convolutional layer is not independent, the convolutional layer parallel processing execution unit 130 may perform parallel processing based on a single OpenCL device-based kernel at step S350.

Until parallel processing of all convolutional layers has been completed, a procedure including steps S320, S330, S340, and S350 may be repeatedly performed at step S360.

The convolutional layer acceleration unit 100 and the method for operating the convolutional layer acceleration unit according to an embodiment of the present invention may automatically analyze the convolutional layer information of the convolutional neural network 10 when the embedded system 20 having multiple OpenCL devices performs forward propagation of the convolutional neural network 10, and may utilize an acceleration function for forward propagation of the convolutional layers based on the multiple OpenCL devices through such analysis even if professional knowledge about OpenCL or the embedded system 20 is not present.

Also the convolutional layer acceleration unit according to the embodiment of the present invention may be applicable to a framework for an actual service.

Figure 5:
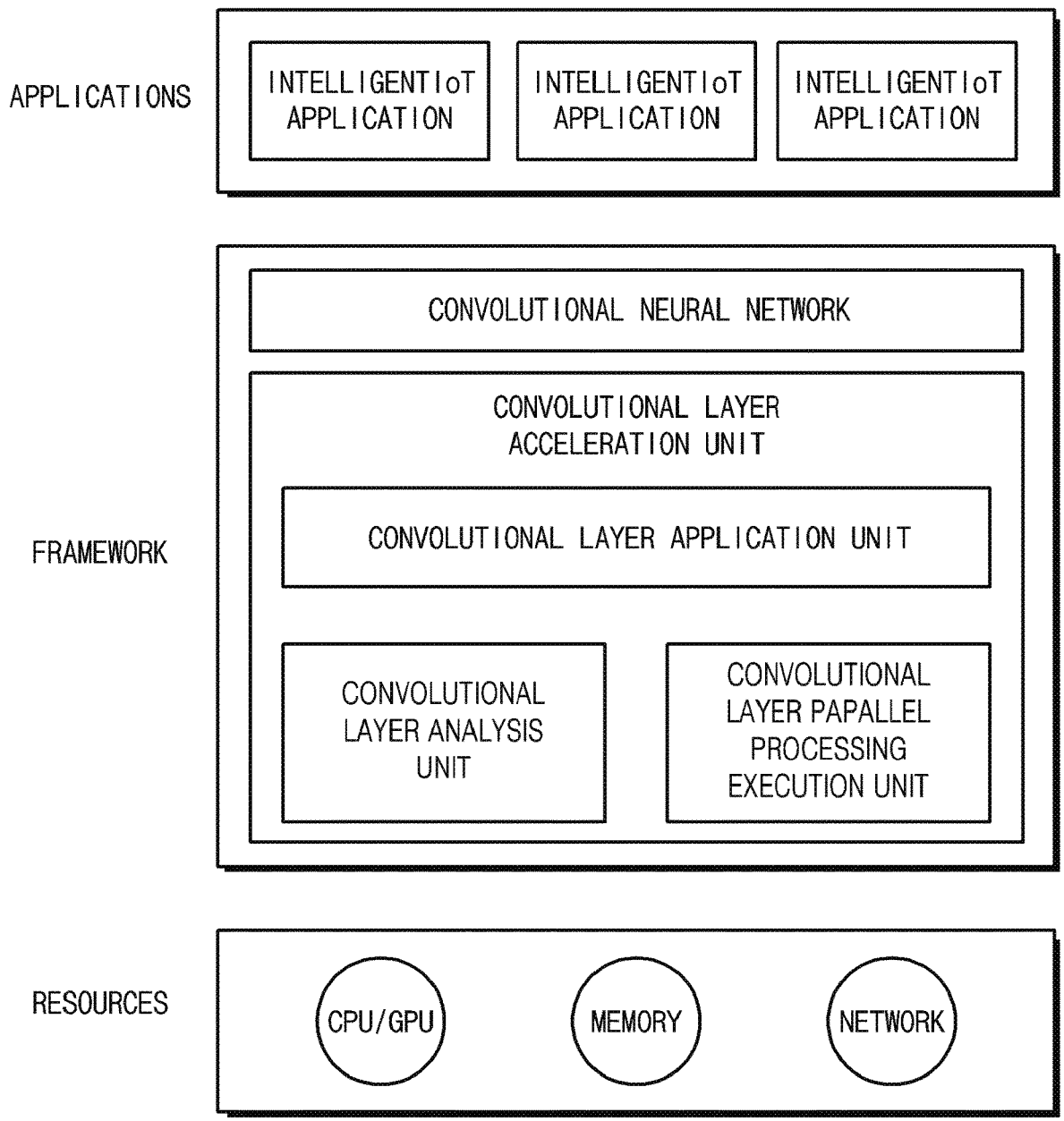
FIG. 5 is a diagram conceptually illustrating an actual service application about a convolutional layer acceleration unit according to an embodiment of the present invention.

FIG. 5 is a diagram conceptually illustrating an actual service application about a convolutional layer acceleration unit according to an embodiment of the present invention. Referring to FIG. 5, the convolutional layer acceleration unit may be included in a software framework for Internet of Things (IoT) and operate.

Also the convolutional layer acceleration unit according to the embodiment of the present invention may be applied to a Lightweight intelligent software framework (LISF) for the IoT.

With the development of IoT technologies, intelligent technologies are rapidly developing and launching on various ICT (Information and Communications Technology) service domains. In order to support intelligent capability on resource-limited IoT device, IoT software framework which enables intelligent capability between application layer and HW resource layer plays an important role.

Generally, ISF (Intelligent Software Framework) primarily performs in server-side cloud computing and high performance computing environments with rich resources. The framework conceptually consists of pre-processing entity, learning entity, and inferencing entity for intelligence processing. Additionally, training data and real-world data are needed. The ISF gets high quality training data through pre-processing entity, creates learning model by using a learning entity that can learn through the data, and predicts various inferencing for new data by using the model based inferencing entity.

Pre-processing entity: filtering data or transforming data into different format
Learning entity: searching regularity and pattern in data
Inferencing entity: performing classification and estimation for new data Recently, many kinds of current IoT devices are embedded with GPGPU (General-Purpose Computing on Graphics Processing Unit) and Multicore CPU (Central Processing Unit), though not enough processing capability. Nevertheless, with these IoT devices, new requirements of intelligent IoT service are demanded to provide near-realtime IoT data processing, privacy handling, and low-latency. In order to achieve intelligence capability in embedded systems with limited system resources, there are several issues to be resolved in the aspect of their HW and SW.

HW: high clock speed/the number of cores and efficient power management regrading CPU and GPGPU in order to support one specified task or set of tasks as well as many different types of programs
SW: acceleration technology using CPU and GPGPU based parallelism and lightweight technology through optimization of intelligent software framework It is very important to solve or improve these issues for HW and SW. The reason is that generally embedded systems are dedicated to one specific task or set of tasks so that it is not easy for them to work complex programs with heavy workloads such as intelligent services (we call it CPU-intensive program). When these programs work on embedded systems, different types of overhead (e.g. high CPU/GPGPU utilization, CPU/GPGPU thermal, memory leak, etc.) occurs. Because of these overhead, these programs suddenly are shut down or even the entire system may crash due to them. Lately embedded systems, however, tend to execute complex programs with heavy workloads in order to provide intelligent services (e.g. face recognition, vacuum cleaner, autonomous car/drone driving). Therefore, the LISF (lightweight intelligent software framework) is necessary to support intelligence on resource-limited IoT devices. With the LISF, IoT devices can perform intelligent IoT applications handling in resource constrained environment, and can support to access intelligent capability from cross-domain IoT applications in a standardized way. IoT devices with the LISF can provide intelligent services to users.

The LISF working on embedded system is necessary to consider some limitations on limited system resources such as IoT devices. An intelligent job such as machine learning and deep learning (e.g. learning and inferencing) require a lot of computation. However, it is almost impossible to support heavy computation in embedded systems because IoT device's CPU and GPGPU performance is much lower than the performance of high performance computers (such as server-side computer). For this reason, it is essential to support an approach that can make the best use of CPU and GPGPU capacities. The approach is an accelerating technology based on software (e.g. OpenCL and CUDA). And a variety of intelligent applications and services working on embedded systems requires on high-performance computing environment, so that generally the accelerating technology is necessary to apply to embedded systems. Therefore, the LISF provides a method for operating an embedded system to perform an accelerated processing capability. This method is three comprised of initializing, configuring and processing in parallel. The first, initializing and configuring entities present in parallel, is for performing mathematical operations in parallel by a parallel managing function entity. The parallel managing function entity allocates a device memory, copies data from a host to a device, sets a kernel, and again copies results of an operation. So, the instances of the kernel are executed in parallel while each of the instances is processing a single work item and are executed together as multiple work items as a part of a work group. The second, the processing in parallel, is mathematical operations using the configured entities by an acceleration-managing function entity. In this situation, most of them have a trade-off between accuracy (e.g. object recognition rate) and real-time (e.g. FPS). For example, if accuracy for object recognition rate is high, detection or inferencing time for objects can be slow. As an embedded system has overhead due to a lot of computation, and applications and services may not work properly.

Figure 6:
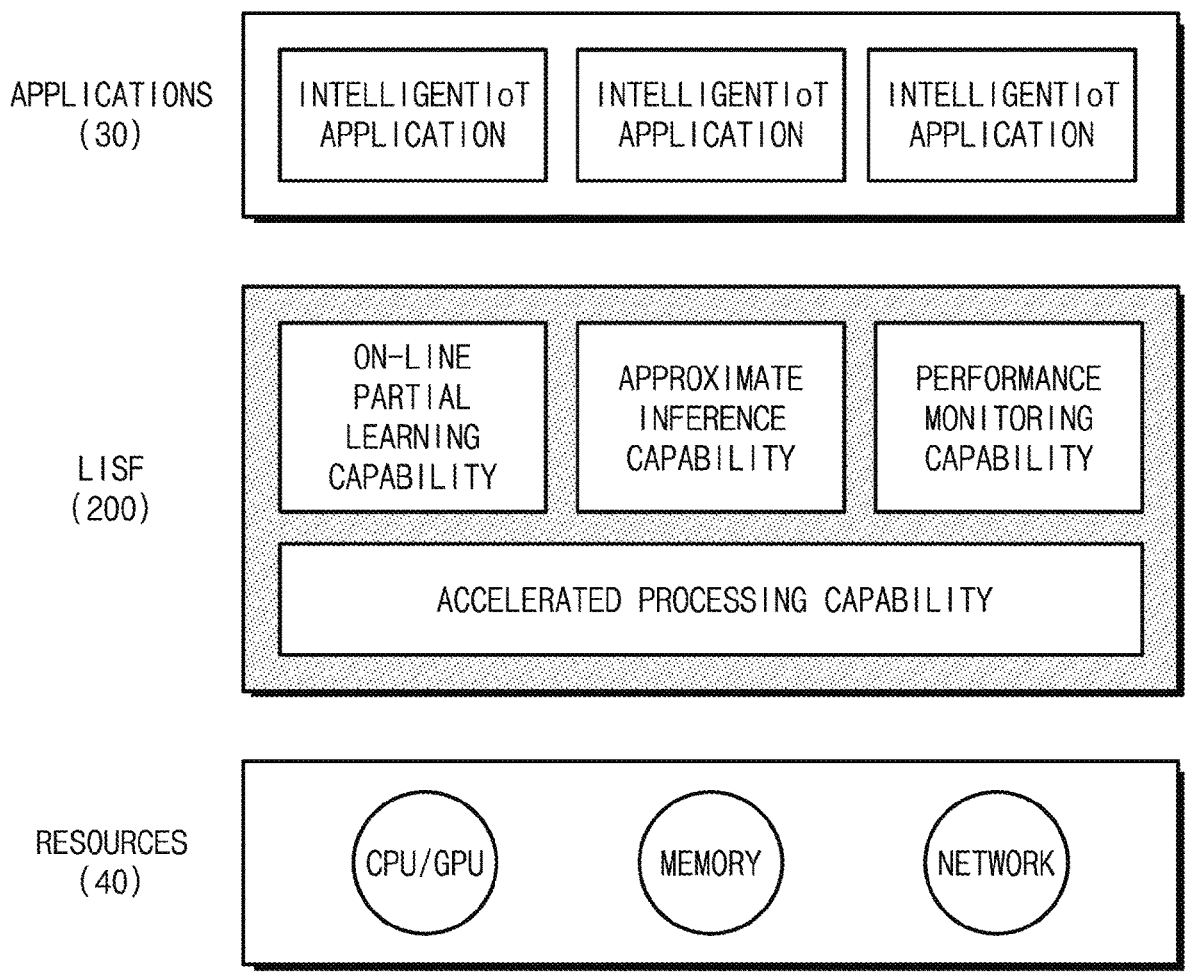
FIG. 6 is a diagram conceptually illustrating a Lightweight Intelligent Software Framework (LISF) according to an embodiment of the present invention.

FIG. 6 is a diagram conceptually illustrating an LISF according to an embodiment of the present invention. Referring to FIG. 6, a LISF 200 may be disposed between an application layer 30 and a resource layer 40. The LISF 200 may perform online partial learning, approximate inference, performance monitoring, and accelerated processing.

The applications in the application layer may include lightweight IoT applications executed on the embedded system. The lightweight applications may be operated with short latency and high power efficiency on the embedded system. An intelligent IoT may perform intelligent computing, such as machine learning or deep learning, in real time, provide efficient and scalable intelligent computing in a limited resource environment, provide short latency and an improved function of processing the accelerator, and monitor resource usage status.

The LISF may perform capabilities related to learning, inference, performance monitoring, and accelerated processing. The LISF may provide artificial intelligence optimized for the embedded system, and may process those functions in a resource-limited embedded environment in which low-power performance is maximized in real-time operation.

In an embodiment, the online partial learning capability may perform online partial learning in intelligent IoT applications. In a resource-limited environment, a mechanism for processing partial learning must be executed. A lightweight learning model for an on-device environment may be provided. For fast learning, a high-density compression model and processing performance may be provided. In order to accelerate a matrix operation in machine learning, a parallel computing handling framework must be used.

In an embodiment, an approximate inference capability enables real-time inference to be performed for intelligent IoT applications. Real-time processing for inference may be provided. For the online partial learning, an optimized network flow may be provided. For artificial intelligence applications, an operation without network connection and a simple configuration may be provided.

In an embodiment, the performance monitoring capability may perform monitoring of usage of resources. The performance of a profiling function and data parsing analysis must be monitored. Information for collecting General-Purpose GPU (GPGPU) acceleration performance data may be provided. Status information for executing resources may be provided.

In an embodiment, an accelerated processing capability may provide acceleration technology for intelligent IoT applications. In order to accelerate machine learning, GPU-based adaptive acceleration operations, such as basic linear algebra, may be supported. In order to set optimal performance parameters and generate a kernel in a binary format, a parallel processing operation acceleration unit (i.e. accelerator) may be provided. In the embedded system, a parallel-processing-enabled execution unit in a buffer for acceleration-based operations and kernel operations may be provided. In order to return the results of acceleration-based operations to the machine-learning algorithm, an accelerator application may be provided. To generate parallel-computing-related device information, an accelerator analysis unit may be provided.

The resources in the resource layer may include, for example, CPU/GPU, memory, a network, etc. For real-time processing of intelligent IoT applications, hardware resources may be provided.

The LISF on embedded systems may be run in the aspect of performance, power, and memory. The LISF-based artificial intelligence services, e.g., drone rental service, should support the real-time and seamless execution of the services. However, the following three conditions should be avoided for providing the execution.
  Becoming slow for service response time,
  Suddenly stopping during its execution, or
  Service termination due to abnormal execution.

These three conditions are caused by the lack of resources in embedded systems. Therefore, system resources efficiently are used when LISF-based services are working on embedded systems. In order to resolve the issue, the LISF needs to support some features.
  It uses for embedded system resources in efficient, which there are lightweight and accelerated techniques for CPU, GPGPU, and Memory.
  It supports online partial learning due to resource-limited embedded systems. Fully learning generally works on server systems.
  It generates a personalized learning model that fits in a system environment through online partial learning.
  It works with a client-server model, where client is a poor-resource system (e.g. smart phone) and server is a rich-resource system (e.g., high performance computer).

In a client and server mechanism of LISF, the server system and IoT device may have an artificial intelligence framework respectively. The system is comprise of device, platform, context, command queue and kernel. Device is comprises actual processors for performing the mathematical operations. The platform comprises of using at least one Central Processing Unit (CPU), at least one Graphics Processing Unit (GPU), at least one processor, or at least one hardware acceleration unit. The context comprises an entity for managing the resources in a device set. The command queue comprises an entity for executing a kernel and performing memory mapping/unmapping and synchronization. The kernel comprises a code running on the device. The artificial intelligence framework in the server system performs pre-processing and fully learning. The fully learning can utilize a pruning method in order to generate an optimized learning model. The pruning method is to steadily change superfluous weight values into zero during learning training data. Pre-processing and fully learning require a lot of computation since they create initial learning model using training data, so that the server system has a high performance computing environment. The initial learning model transmits to IoT device's artificial intelligence framework.

Figure 7:
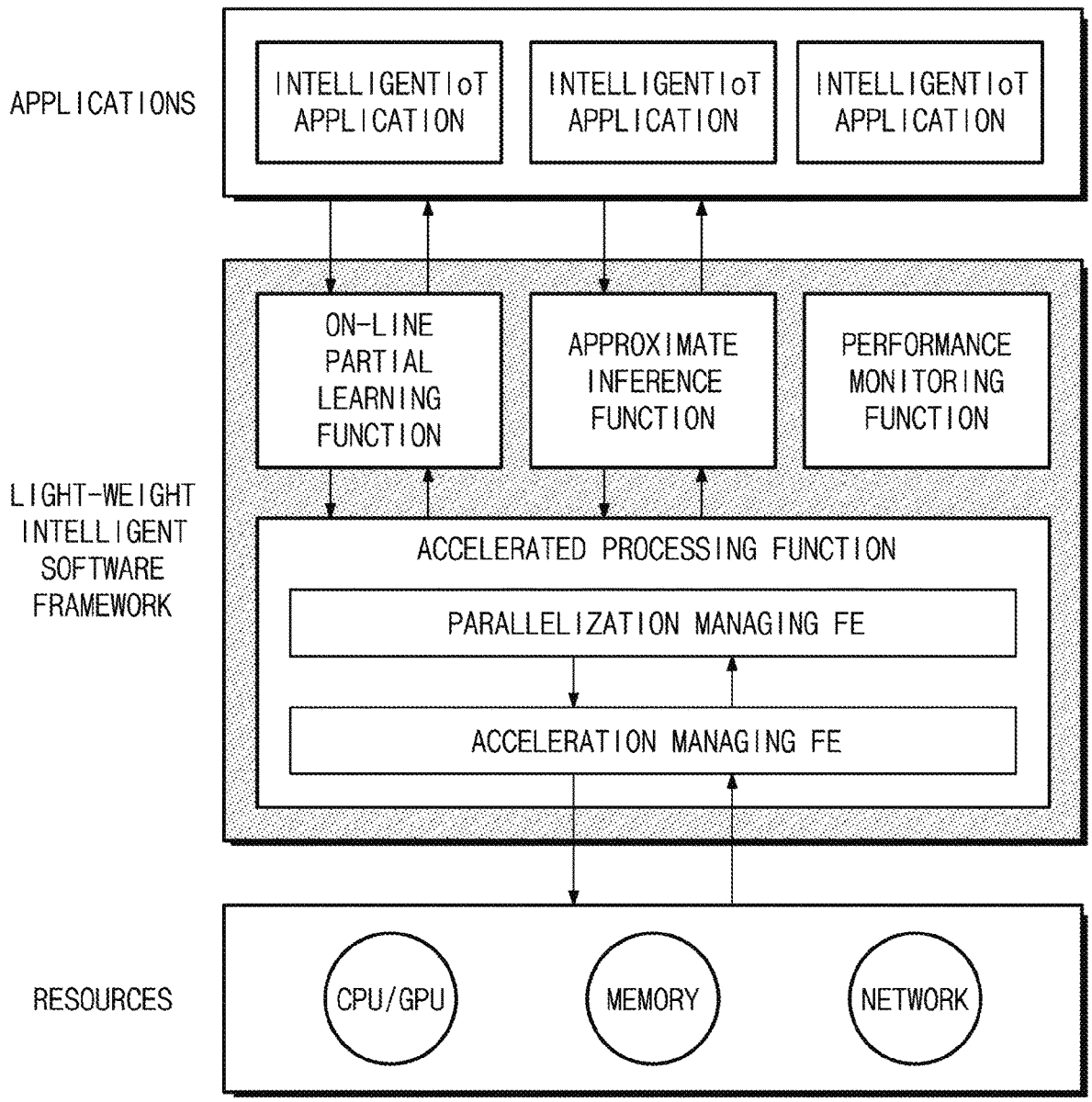
FIG. 7 is a diagram illustrating in detail an accelerated processing capability of the LISF illustrated in FIG. 6.

FIG. 7 is a diagram illustrating in detail the accelerated processing capability of the LISF illustrated in FIG. 6. Referring to FIG. 7, the accelerated processing capability may optimize the usage of resources for a given learning model. All layers in a learning model require various mathematical operations for learning and inference. The accelerated processing capability may be optimized for basic hardware resources, and may provide parallel mathematical operations. Also, the accelerated processing capability may check performance statistics provided by a performance monitoring capability so as to identify bottlenecks. Depending on the results of this checking, the configuration of usage of hardware resources may be updated to accelerate an online partial learning capability and an approximate inference capability. The accelerated processing capability is required in order to accelerate mathematical operations used for constituent layers of the learning model. The mathematical operations may include, for example, normal linear algebraic operations, such as a vector addition, a scalar multiplication, an inner product, a linear combination, and a matrix multiplication.

The mathematical operations may include a General Matrix Multiply (GEMM) operation.

Further, the accelerated processing capability may be composed of a parallelization managing FE and an acceleration managing FE.

The parallelization managing FE may initialize and configure the following entities present in resources so that mathematical operations are performed in parallel so as to improve the execution speed of layers.

For example, a platform may include specific heterogeneous platforms, each composed of a CPU, a GPU, and an additional processor or hardware accelerators. A device may include actual processors for performing calculations, for example, a CPU, a GPU, etc. Context is an entity for managing the resources in a device set. A command queue is an entity for executing a kernel and performing memory mapping/unmapping and synchronization. A kernel is code operating on a device.

Such an entity may allocate device memory, copy data from a host to a device, set a kernel, and copy the results of execution. This entity is needed in order to design parallel applications. A basic assumption is made such that a large number of instances of the kernel are executed in parallel while each of the instances is processing a single work item. Multiple work items may be executed together as a part of a work group. Within the work group, each kernel instance may communicate with different instances.

The parallelization managing FE initializes and configures the following entities within the resource to run mathematical operations in parallel to speed up layer execution. And, the parallelization managing FE manages a parallel-processing queue for performing parallel processing depending on a number of devices of the embedded system such as OpenCL devices. And, the parallelization managing FE divides a matrix with weights and bias values considering a parallel processing performance of the device to maximize parallelism in multiple device environments, and the parallel processing capability of the device is determined by the number of kernel instances that are executed at a time, a maximum work group size of the device or a maximum work item size.

platform: specific targeted heterogeneous platform consisting of CPUs, GPUs, and other processors or hardware accelerators;

device: actual processors (e.g. CPU, GPU, etc.) performing the calculation;

context: an entity that manages the resources on a device set;

command queue: an entity that execute the kernel and perform memory mapping/unmapping and synchronization;

kernel: codes running on a device.

The parallelization managing FE allocates device memory, copy data from the host to the device, set up the kernel, and copy the result again. It is necessary to design for parallel applications. The basic assumption is that many instances of the kernel run in parallel, each processing a single work item. Multiple work items run together as part of a work group. An instance of each kernel in the work group communicates with an additional instance.

Meanwhile, the acceleration managing FE may manage a framework for a kernel (e.g. OpenCL) for supporting a series of mathematical operations. The acceleration managing FE may support mathematical routines which provide standard building blocks for performing fundamental vectors and matrix operations. Here, the mathematical operations may include scalar operations, vector operations, and/or vector-related operations, operations between a matrix and a vector, as well as operations between a matrix and additional matrices.

Figure 8:
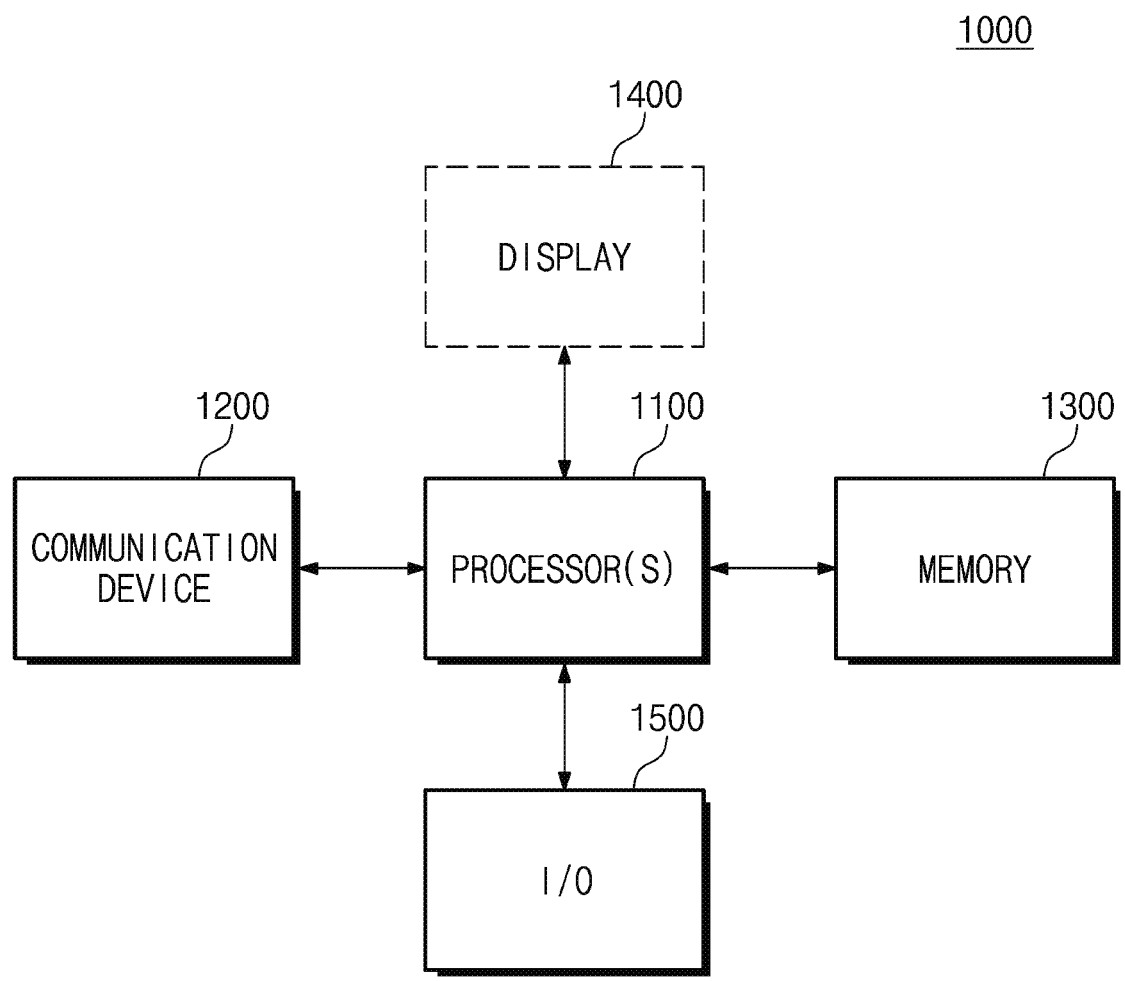
FIG. 8 is a diagram exemplarily illustrating an electronic device according to an embodiment of the present invention.

The acceleration managing FE manages framework for kernel, which supports the set of mathematical operations. The set of mathematical operations include operations in neural network such as Convolutional Neural Network (CNN). The acceleration managing FE supports mathematical routines that provide standard building blocks for performing basic vector and matrix operations. The acceleration managing FE controls the resources so that a device such as OpenCL device performs a General Matrix Multiply (GEMM) operation on the divided matrix and input data depending on the divided matrix. And, the acceleration managing FE groups the matrix into vectors to maximize a workload for each kernel, and determines on a size of a work group to allow each device to perform parallel processing. And, the acceleration managing FE shares a memory between a host and devices to minimize the cost of the GEMM operation, each device performs mathematical routines without copying data between the host and the device by accessing the host's a vector and a matrix using a memory address.

operations with scalar and vector and/or vector and vector, operations with matrix and vector, and operations between matrix FIG. 8 is a diagram exemplarily illustrating an electronic device 1000 according to an embodiment of the present invention. Referring to FIG. 8, the electronic device 1000 may include at least one processor 1100, a network interface (communication device) 1200, memory 1300, a display 1400, and an input/output (I/O) device 1500.

The processor 1100 may include at least one device described above with reference to FIGS. 1 to 7 or may be implemented as at least one method described above with reference to FIGS. 1 to 7. As described above, the processor 1100 may execute instructions such that an embedded system automatically analyzes the features of convolutional layers and provides layer parallel processing for multiple convolutional layers using multiple OpenCL devices based on the analyzed convolutional layer information, and thus an accelerator for a convolutional layer that spends most operation time in forward propagation of the convolutional neural network may be used, even if professional knowledge about the embedded system and OpenCL is not present.

The processor 1100 may execute programs and control the electronic device 1000. The electronic device may be connected to an external device (e.g. a personal computer or a network) through the input/output device 1500, and may exchange data therewith. The electronic device may include any of various electronic systems, for example, mobile devices, such as a mobile phone, a smart phone, a Personal Digital Assistant (PDA), a tablet computer, and a laptop computer, computing devices, such as a personal computer, a tablet computer, and a Netbook, or electronic appliances, such as a television, a smart television, and a security device for gate control.

The network interface 1200 may be implemented to perform communication with an external network in various wired/wireless manners.

The memory 1300 may include computer-readable instructions. The processor 1100 may perform the above-described operations when the instructions stored in the memory 1300 are executed on the processor 1100. The memory 1300 may be volatile memory or nonvolatile memory.

The memory 1300 may include a storage device to store data of a user. The storage device may be an Embedded Multimedia Card (eMMC), a solid-state drive (SSD), universal flash storage (UFS), or the like. The storage device may include at least one nonvolatile memory device. The nonvolatile memory device may be any one of NAND flash memory, Vertical NAND (VNAND) flash memory, NOR flash memory, Resistive Random Access Memory (RRAM), Phase-Change Memory (PRAM), Magnetoresistive Random Access Memory (MRAM), Ferroelectric Random Access Memory (FRAM), and Spin Transfer Torque Random Access Memory (STT-RAM).

The above-described embodiments may be implemented using hardware components, software components, and/or combinations of hardware components and software components. For example, the device, method, and component described above in the embodiments may be implemented using one or more general-purpose computers or special-purpose computers, as in the case of a processor, a controller, an Arithmetic Logic Unit (ALU), a digital signal processor, a microcomputer, a Field-Programmable Gate Array (FPGA), a Programmable Logic Unit (PLU), a microprocessor, or any other device capable of executing and responding to instructions. A processing device may execute an Operating System (OS) and one or more software applications running on the OS.

Further, the processing device may access, store, handle, process and generate data in response to the execution of software. For convenience of understanding, there is the case where a single processing device is described as being used, but those skilled in the art to which the corresponding technical fields pertain will understand that the processing device may include multiple processing elements and/or multiple types of processing elements. For example, the processing device may include multiple processors, or a single processor and a single controller. Furthermore, the processing device may include an additional processing configuration such as a parallel processor.

The software may include a computer program, code, an instruction, or a combination of one or more thereof, and may configure the processing device so that the processing device is operated in a desired manner, or may independently or collectively issue commands to the processing device. The software and/or data may be interpreted by the processing device or may be permanently or temporarily embodied in a certain type of machine, a component, a physical device, virtual equipment, a computer-storage medium or device, or a signal wave to be transmitted so as to provide commands or data to the processing device. The software may be distributed to computer systems connected over a network, and may also be stored or executed in a distributed manner. The software and data may be stored in one or more computer-readable storage media.

The electronic device 1000 according to the embodiment of the present invention may include at least one processor 1100 and the memory 1300, which stores at least one instruction executed by the at least one processor 1100, wherein the at least one instruction may be executed by the at least one processor 1100 such that the convolutional layer application unit receives convolutional layer information of a convolutional neural network; the convolutional layer analysis unit analyzes the convolutional layer information and determines whether to perform layer parallel processing based on whether a convolutional layer corresponding to the OpenCL device information is independent; when the convolutional layer is independent, the convolutional layer parallel processing execution unit divides a matrix corresponding to the convolutional layer in consideration of the performance of each OpenCL device and processes operations corresponding to the convolutional layer in parallel using the divided matrix; when the convolutional layer is not independent, the convolutional layer parallel processing execution unit processes the corresponding operations in parallel based on a kernel through a single OpenCL device.

The method according to the embodiment may be implemented in program instructions that can be executed through various types of computer means, and may be recorded in a computer-readable storage medium. The computer-readable storage medium may include a program instruction, a data file, a data structure, etc. alone or in combination. The program instruction recorded in the medium may be designed and configured especially for embodiments or may be known to and used by those skilled in computer software fields.

Examples of the computer-readable storage medium may include all types of hardware devices specially configured to record and execute program instructions, such as magnetic media, such as a hard disk, a floppy disk, and magnetic tape, optical media, such as compact disk (CD)—read only memory (ROM) and a digital versatile disk (DVD), magneto-optical media, such as a floptical disk, ROM, random access memory (RAM), and flash memory. Examples of the program instructions include machine code, such as code created by a compiler, and high-level language code executable by a computer using an interpreter. The hardware devices may be configured to operate as one or more software modules in order to perform the operation of the present invention, and vice versa.

In the present invention, an Internet of Things (IoT) device may include devices, each of which has an accessible wired or wireless interface and transmits or receives data while communicating with at least one additional device through the wired/wireless interface. The accessible interface may include a modem communication interface that can access a wired Local Area Network (LAN), a Wireless Local Area Network (WLAN) such as Wireless Fidelity (Wi-Fi), a Wireless Personal Area Network (WPAN) such as Bluetooth, Wireless Universal Serial Bus (wireless USB), Zig-Bee, Near-field Communication (NFC), Radio-frequency identification (RFID), Power-line communication (PLC), or a mobile cellular network, such as 3rd Generation (3G), 4th Generation (4G), or Long-Term Evolution (LTE). The Bluetooth interface may support Bluetooth Low Energy (BLE).

The electronic components of the IoT device are not limited thereto, and may be mounted using various types of packages within a wearable housing. The electronic components of the IoT device according to exemplary embodiments may be mounted using Package On Package (POP), Ball-grid arrays (BGAs), Chip scale packages (CSPs), Plastic Leaded Chip Carrier (PLCC), Plastic Dual In-Line Package (PDIP), Chip On Board (COB), Ceramic Dual In-Line Package (CERDIP), Plastic Metric Quad Flat Pack (MQFP), Thin Quad Flatpack (TQFP), Small Outline (SOIC), Shrink Small Outline Package (SSOP), Thin Small Outline (TSOP), Thin Quad Flatpack (TQFP), System In Package (SIP), Multi-Chip Package (MCP), Wafer-level Fabricated Package (WFP), Wafer-Level Processed Stack Package (WSP).

The convolutional layer acceleration unit, the embedded system having the convolutional layer acceleration unit, and the method for operating the embedded system in accordance with embodiments of the present invention are advantageous in that an embedded system having multiple OpenCL devices may automatically analyze the convolutional layer information of a convolutional neural network when forward propagation of the convolutional neural network is performed, and thus an acceleration function for forward propagation of the convolutional layers may be used based on the multiple OpenCL devices through such analysis even if professional knowledge about OpenCL or the embedded system is not present.

Meanwhile, the above description of the present invention merely shows detailed embodiments for practicing the present invention. The present invention may include not only a detailed means that can be actually utilized, but also a technical spirit that is an abstract and conceptual idea and that can be used as technology in the future.

What is claimed is:

1. A method for operating an embedded system, the embedded system performing an accelerated processing capability using a Lightweight Intelligent Software Framework (LISF), comprising:
   initializing and configuring, by a parallelization managing Function Entity (FE), entities within resources for performing mathematical operations in parallel; and
   processing in parallel, by an acceleration managing FE, the mathematical operations using the configured entities,
   wherein the parallelization managing FE divides a matrix with weights and bias values taking a parallel processing performance of the device into consideration to maximize parallelism in multiple device environments, the parallel processing capability of the device is determined by the number of kernel instances that are executed at a time, a maximum work group size of the device or a maximum work item size,
   wherein the acceleration managing FE controls the resources so that a corresponding device performs a General Matrix Multiply (GEMM) operation on the divided matrix and input data depending on the divided matrix, and
   wherein the acceleration managing FE groups the matrix into vectors to maximize a workload for each kernel.

2. The method of claim 1, wherein the LISF corresponds to a system comprising a platform, a device, a context, a command queue, and a kernel.

3. The method of claim 2, wherein the platform corresponds to a heterogeneous platform using at least one Central Processing Unit (CPU) and one Graphics Processing Unit (GPU).

4. The method of claim 2, wherein the device comprises actual processors for performing the mathematical operations.

5. The method of claim 2, wherein the context comprises an entity for managing the resources in a device set.

6. The method of claim 2, wherein the command queue comprises an entity for executing a kernel and performing memory mapping/unmapping and synchronization.

7. The method of claim 2, wherein the kernel comprises a code running on the device.

8. The method of claim 1, wherein the mathematical operations include operations in a neural network.

9. The method of claim 1, wherein the parallelization managing FE allocates a device memory, copies data from a host to a device, sets a kernel, and again copies results of an operation.

10. The method of claim 9, wherein instances of the kernel are executed in parallel while each of the instances is processing a single work item.

11. The method of claim 9, wherein instances of the kernel are executed together as multiple work items as a part of a work group.

12. The method of claim 11, wherein an instance of each kernel in the work group communicates with an additional instance.

13. The method of claim 9, wherein the parallelization managing FE manages a parallel-processing queue for performing parallel processing depending on a number of devices in the embedded system.

14. The method of claim 1, wherein:
   the GEMM operation is represented by an equation of $C=\alpha AB+\beta C$, where A, B, and C are matrices and $\alpha$ and $\beta$ are scalar values,
   sizes of matrices A, B, and C are indicated by M, N, and K,
   the size of matrix A is M*K,
   the size of matrix B is K*N, and
   the size of matrix C is M*N.

15. The method of claim 14, wherein the parallelization managing FE divides rows of matrix A by a number of OpenCL devices, and a size of a sub-matrix resulting from division is determined by a number of corresponding OpenCL devices and a number of usable OpenCL devices.

16. The method of claim 1, wherein the acceleration managing FE shares a memory between a host and devices to minimize the cost of the mathematical operations, each device performs mathematical routines without copying data between the host and the device by accessing the host's a vector and a matrix using a memory address.

17. The method of claim 1, wherein the acceleration managing FE determines on a size of a work group to allow each device to perform parallel processing.

18. A convolutional layer acceleration unit of an embedded system, comprising:
   at least one processor; and
   a memory for storing at least one instruction to be executed by the at least one processor,
   wherein the at least one instruction is configured to operate the at least one processor such that:
   a convolutional layer application unit receives convolutional layer information of a convolutional neural network;
   a convolutional layer analysis unit analyzes the convolutional layer information and determines whether to perform layer parallel processing based on whether a convolutional layer corresponding to OpenCL device information is independent;
   the convolutional layer parallel processing execution unit is configured to, when the convolutional layer is independent, divide a matrix corresponding to the convolutional layer in consideration of performance of individual OpenCL devices, and process operations corresponding to the convolutional layer in parallel using the divided matrix; and
   the convolutional layer parallel processing execution unit is configured to, when the convolutional layer is not independent, process the corresponding operations in parallel based on a kernel through a single OpenCL device.

19. An embedded system, comprising:
   resources; and
   an acceleration unit,
   wherein the acceleration unit is configured such that:
   a parallelization managing FE initializes and configures entities within the resources for performing mathematical operations in parallel; and
   an acceleration managing FE processes the mathematical operations in parallel using the configured entities, wherein the parallelization managing FE divides a matrix with weights and bias values taking a parallel processing performance of the device into consideration to maximize parallelism in multiple device environments, the parallel processing capability of the device is determined by the number of kernel instances that are executed at a time, a maximum work group size of the device or a maximum work item size, wherein the acceleration managing FE controls the resources so that a corresponding device performs a General Matrix Multiply (GEMM) operation on the divided matrix and input data depending on the divided matrix, and wherein the acceleration managing FE groups the matrix into vectors to maximize a workload for each kernel.

* * * * *